US006638584B1

(12) United States Patent
Weder

(10) Patent No.: US 6,638,584 B1
(45) Date of Patent: *Oct. 28, 2003

(54) FOLDED CORRUGATED DECORATIVE GRASS FORMED OF PAPER AND METALLIZED FILM

(75) Inventor: Donald E. Weder, Highland, IL (US)

(73) Assignee: Southpac Trust International, Inc., Rarotonga (CK)

(*) Notice: Subject to any disclaimer, the term of this patent is extended or adjusted under 35 U.S.C. 154(b) by 75 days.

This patent is subject to a terminal disclaimer.

(21) Appl. No.: 10/106,704

(22) Filed: Mar. 20, 2002

Related U.S. Application Data

(63) Continuation of application No. 09/779,927, filed on Feb. 8, 2001, now Pat. No. 6,365,241, which is a continuation of application No. 09/562,742, filed on May 2, 2000, now Pat. No. 6,190,783, which is a continuation of application No. 09/532,809, filed on Mar. 21, 2000, which is a continuation of application No. 09/109,563, filed on Jul. 2, 1998, now abandoned.

(60) Provisional application No. 60/052,361, filed on Jul. 11, 1997.

(51) Int. Cl.[7] .................................................. A01N 3/00

(52) U.S. Cl. ........................... 428/17; 428/58; 428/181; 428/182; 428/192

(58) Field of Search ................................ 428/17, 542.2, 428/58, 192, 181, 182

(56) References Cited

U.S. PATENT DOCUMENTS 2,016,334 A 10/1935 McComb
2,141,235 A 12/1938 Angeletti
2,244,845 A 6/1941 Matthews
2,336,100 A 12/1943 Jacque et al.
2,399,744 A 5/1946 Kaphan
2,679,887 A 6/1954 Doyle et al.
3,398,434 A 8/1968 Alesi, Jr. et al.
3,416,991 A 12/1968 Yoshimura
3,459,845 A 8/1969 Hebeler
3,503,292 A 3/1970 Kingberg
3,558,580 A 1/1971 Orser
3,607,583 A 9/1971 Geschwender
3,650,877 A 3/1972 Johnson
3,673,056 A 6/1972 Nadler
3,803,284 A 4/1974 Burghardt
3,869,533 A 3/1975 Jonocha et al.
3,898,117 A 8/1975 Taylor
3,933,959 A 1/1976 Skochdopole et al.
4,012,932 A 3/1977 Gewiss
4,045,949 A 9/1977 Paton et al.
4,056,646 A 11/1977 Westfall et al.
4,132,155 A 1/1979 Hicks et al.
4,199,627 A 4/1980 Weder et al.
4,255,487 A 3/1981 Sanders
4,292,266 A 9/1981 Weder et al.
4,359,442 A 11/1982 Cleminson et al.
4,385,087 A 5/1983 Roberts et al.
4,401,700 A 8/1983 Weder et al.
4,496,614 A 1/1985 Weder et al.
4,549,908 A 10/1985 Weder et al.
4,735,669 A 4/1988 Guida et al.
4,989,396 A 2/1991 Weder et al.
5,088,972 A 2/1992 Parker
5,105,599 A 4/1992 Weder
5,111,637 A 5/1992 Weder et al.

(List continued on next page.)

FOREIGN PATENT DOCUMENTS

WO 9916615 4/1999

*Primary Examiner*—Deborah Jones
*Assistant Examiner*—Abraham Bahta
(74) *Attorney, Agent, or Firm*—Dunlap, Codding & Rogers, P.C.

(57) ABSTRACT

The present invention discloses folded corrugated material for producing segments or strips for use as Easter grass, packing material and the like or for use as flower pot covers, floral wrappings and ribbon materials.

24 Claims, 10 Drawing Sheets

U.S. PATENT DOCUMENTS

| | | | | | |
|---|---|---|---|---|---|
| 5,134,013 | A | | 7/1992 | Parker | |
| 5,173,352 | A | | 12/1992 | Parker | |
| 5,403,259 | A | | 4/1995 | Parker | |
| 5,492,584 | A | | 2/1996 | Bateman | |
| D368,654 | S | | 4/1996 | Santoiemmo et al. | |
| 5,573,491 | A | | 11/1996 | Parker | |
| 5,576,089 | A | * | 11/1996 | Weder | 428/142 |
| 5,625,979 | A | | 5/1997 | Weder | |
| 5,656,008 | A | | 8/1997 | Beierlorzer | |
| 5,656,233 | A | | 8/1997 | Weder et al. | |
| 5,678,388 | A | | 10/1997 | Weder | |
| 5,694,741 | A | | 12/1997 | Weder et al. | |
| 5,711,752 | A | | 1/1998 | Goldstein | |
| 5,712,020 | A | | 1/1998 | Parker | |
| 5,802,813 | A | | 9/1998 | Weder | |
| 5,871,432 | A | | 2/1999 | Beierlorzer | |
| 5,906,569 | A | | 5/1999 | Ratzel | |
| 5,921,907 | A | | 7/1999 | Beierlorzer | |
| 6,071,574 | A | * | 6/2000 | Weder | 428/17 |
| 6,190,783 | B1 | | 2/2001 | Weder | |
| 6,277,472 | B1 | * | 8/2001 | Weder | 428/181 |
| 6,365,241 | B2 | * | 4/2002 | Weder | 428/17 |
| 6,450,933 | B1 | * | 9/2002 | Gruenke | 493/347 |

* cited by examiner

FOLDED CORRUGATED DECORATIVE GRASS FORMED OF PAPER AND METALLIZED FILM

CROSS REFERENCE TO RELATED APPLICATIONS

This application is a continuation of U.S. Ser. No. 09/779,927, entitled "FOLDED CORRUGATED DECORATIVE GRASS FORMED OF PAPER AND POLYMERIC FILM", filed Feb. 8, 2001 now U.S. Pat. No. 6,365,241 which is a continuation of U.S. Ser. No. 09/562,742 entitled "FOLDED CORRUGATED MATERIAL AND METHOD FOR PRODUCING SAME", filed May 2, 2000 now U.S. Pat. No. 6,190,783, which is a continuation of U.S. Ser. No. 09/532,809 entitled "FOLDED CORRUGATED MATERIAL AND METHOD FOR PRODUCING SAME", filed Mar. 21, 2000, which is a continuation of U.S. Ser. No. 09/109,563 entitled "FOLDED CORRUGATED MATERIAL AND METHOD FOR PRODUCING SAME", filed Jul. 2, 1998, now abandoned, which claims the benefit of U.S. Provisional application U.S. Ser. No. 60/052,361, filed Jul. 11, 1997.

STATEMENT REGARDING FEDERALLY SPONSORED RESEARCH OR DEVELOPMENT

Not applicable.

FIELD OF THE INVENTION

The present invention relates to corrugated materials and methods for producing same, and more particularly but not by way of limitation, to decorative grass, flower pot covers, floral wrappings and ribbon materials made from such folded corrugated materials. In one aspect, the present invention relates to methods for producing decorative grass and flower pot covers and to methods of wrapping floral groupings and flower pots with a sheet of folded corrugated material to provide a decorative cover for such floral groupings and flower pots.

DETAILED DESCRIPTION

Figure 1A:
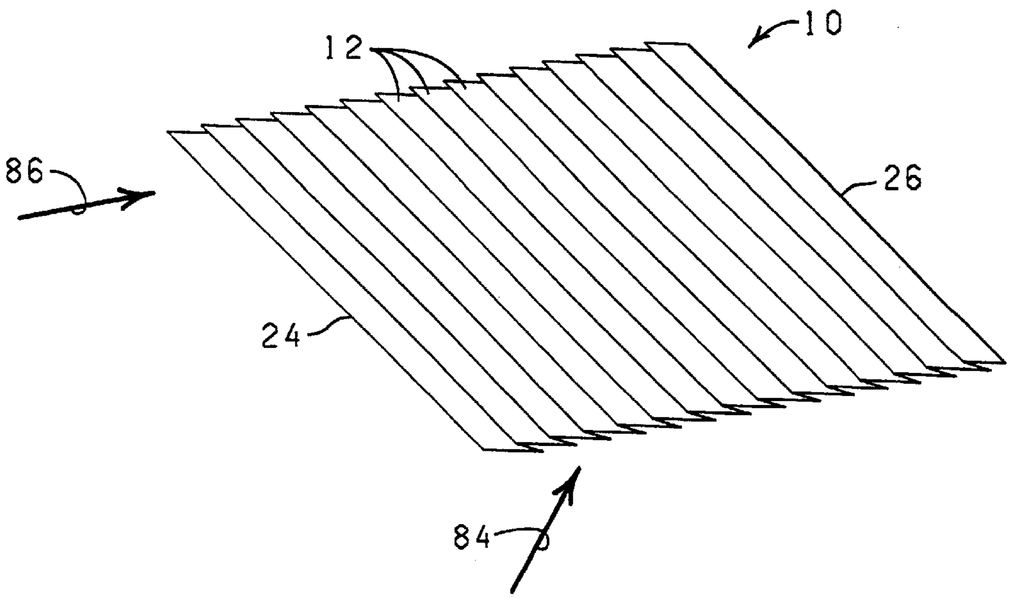
FIG. 1A is a perspective view side of a sheet of folded corrugated material constructed in accordance with the present invention.

Referring now to FIG. 1, designated generally by the reference numeral 10 is a sheet of folded corrugated material. The sheet of folded corrugated material 10 has a plurality of folds 12 substantially as shown. As will be more fully described in detail hereinafter, each of the folds 12 has a first leg or segment 14 and a second leg or segment 16 which extend from a crease 18. The first leg or segment 14 has a length 20 (FIG. 2B); and the second leg or segment 16 has a length 22 (FIG. 2B) which is either greater than or less than the length 20 of the first leg or segment 14 of the folds 12. That is, if the length 20 of the first leg or segment 14 is greater than the, length 22 of the second leg or segment 16 of the folds 12, the folds 12 tend to overlay a portion of an adjacent fold 12 such that the folds 12 extend in the direction of a first end 24 of the sheet of folded corrugated material 10 as shown in FIG. 1A. On the other hand, if the length 20 of the first leg or segment 14 is less than the length 22 of the second leg or segment 16 of the folds 12, the folds 12 tend to overlay a portion of an adjacent fold 12 such that the folds 12 extend in the direction of a second end 26 of the sheet of folded corrugated material 10.

The length of the first and second legs or segments 14 and 16 of the folds 12 can vary widely and will generally depend on the shingle effect and appearance desired in the sheet of folded corrugated material 10. Generally, however, it is desirable that the lengths 20 and 22 of the first and second legs or segments 14 and 16, respectively, be such so that when the folds 12 are formed, the overlaying folds 12 cover at least about 55 percent of the surface area of the adjacent underlying folds 12, and more desirably at least about 90 percent of the surface area of the adjacent underlying folds 12.

Figure 1B:
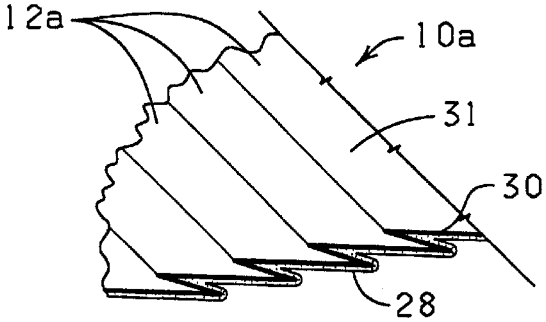
FIG. 1B is a fragmental perspective view of a sheet of folded corrugated material constructed in accordance with the present invention having a bonding material disposed on at least a portion of a lower side thereof.

Referring now to FIG. 1B, designated generally by the reference numeral 10*a* is a portion of a sheet of folded corrugated material. The sheet of folded corrugated material 10*a* has a plurality of folds 12*a* and the sheet of folded corrugated material 10*a* is substantially identical in construction as the sheet of folded corrugated material 10 herein before described except that a bonding material 28 is disposed on at least a portion of one or both surfaces of the sheet of folded corrugated material 10*a*, such as the lower surface 30 thereof.

The bonding material 28 may have a backing or release strip (not shown). The backing or release strip may be left applied for a period of time to the bonding material 28 after it is disposed on a surface of the sheet of folded corrugated material 10*a* prior to its use as a wrapping material, to protect the bonding qualities of the bonding material 28. The bonding material 28 can be disposed on a sheet of material used in the production of the folded corrugated material 10*a* (FIG. 1B) to substantially cover one or both of the lower surface 30 and an upper surface 31 of the sheet of material, or in a continuous strip. Further, the bonding material 28 may be discontinuous, or disposed in any of a variety of patterns such as spots, circles, dots or any other geometric or biomorphic shape, including decorative designs, as long as the bonding material 28 is positioned to function in accordance with the present invention.

The term "bonding material" when used herein can mean an adhesive, frequently a pressure sensitive adhesive, or a cohesive or any adhesive/cohesive combination having adhesive qualities (i.e., qualities of adhesion or adhesion/cohesion, respectively) sufficient to cause the attachment of a portion of the sheet of folded corrugated material 10*a* to itself, to a floral grouping, or to a flower pot. Since the bonding material 28 may comprise either an adhesive or an adhesive/cohesive combination, it will be appreciated that both adhesives and cohesives are known in the art, and both are commercially available. When the bonding material 28 is a cohesive, a similar cohesive material must be placed on the adjacent surface for bondingly contacting and bondingly engaging with the cohesive material.

The term "bonding material" also includes materials which are heat sealable and, in this instance, the adjacent portions of the material must be brought into contact and then heat must be applied to effect the seal. The term "bonding material" also. includes materials which are sonic sealable and vibratory sealable. The term "bonding material" when used herein also means a heat sealing lacquer or hot melt material which may be applied to the material and, in this instance, heat, sound waves, or vibrations, also must be applied to effect the sealing.

The term "bonding material" when used herein also means any type of material or thing which can be used to effect the bonding or connecting of the two adjacent portions of the sheet of folded corrugated material 10*a* to effect the connection or bonding described herein. The term "bonding material" may also include ties, labels, bands, ribbons, strings, tapes (including single or double-sided adhesive tapes), staples or combinations thereof. Some of the bonding materials would secure the ends of the material while other bonding materials may bind the circumference of a wrapper, or a sleeve, or, alternatively and/or in addition, the bonding materials would secure overlapping folds in the material and/or sleeve. Another way to secure the wrapping and/or sleeve is to heat seal the ends of the material to another portion of the material. One way to do this is to contact the ends with an iron of sufficient heat to heat seal the material.

Alternatively, a cold seal adhesive may be utilized as the bonding material 28. The cold seal adhesive adheres only to a similar substrate, acting similarly as a cohesive, and binds only to itself. The cold seal adhesive, since it bonds only to a similar substrate, does not cause a residue to build up on equipment, thereby both permitting much more rapid disposition and use of such equipment to form articles and reducing labor costs. Further, since no heat is required to effect the seal, the dwell time, that is, the time for the sheet of material to form and retain the shape of an article, such as a flower pot cover or flower pot, is reduced. A cold seal adhesive binds quickly and easily with minimal pressure, and such a seal is not readily releasable. This characteristic is different from, for example, a pressure sensitive adhesive.

The term "bonding material" when used herein also means any heat or chemically shrinkable material, and static electrical or other electrical materials, chemical welding materials, magnetic materials, mechanical or barb-type fastening materials or clamps, curl-type characteristics of the film or materials incorporated in material which-can cause the material to take on certain shapes, cling films, slots, grooves, shrinkable materials and bands, curl materials, springs, and any type of welding method which may weld portions of the material to itself or to the pot, or to both the material itself and the pot.

Figure 19:
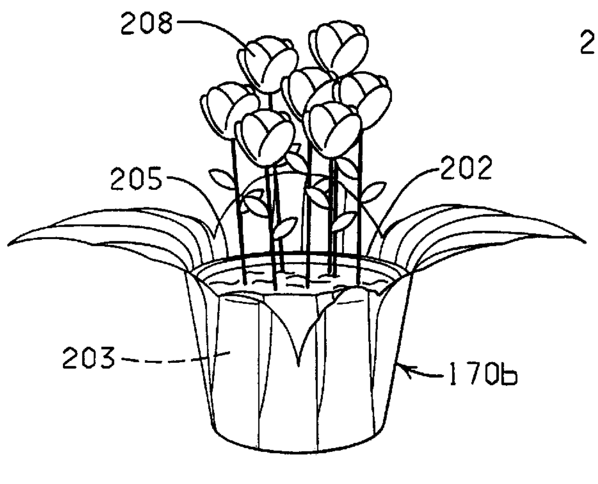
FIG. 19 is a perspective view of a flower pot disposed in the sleeve of FIG. 17 wherein an upper portion of the sleeve has been removed to provide a decorative cover having a skirt.
Figure 20:
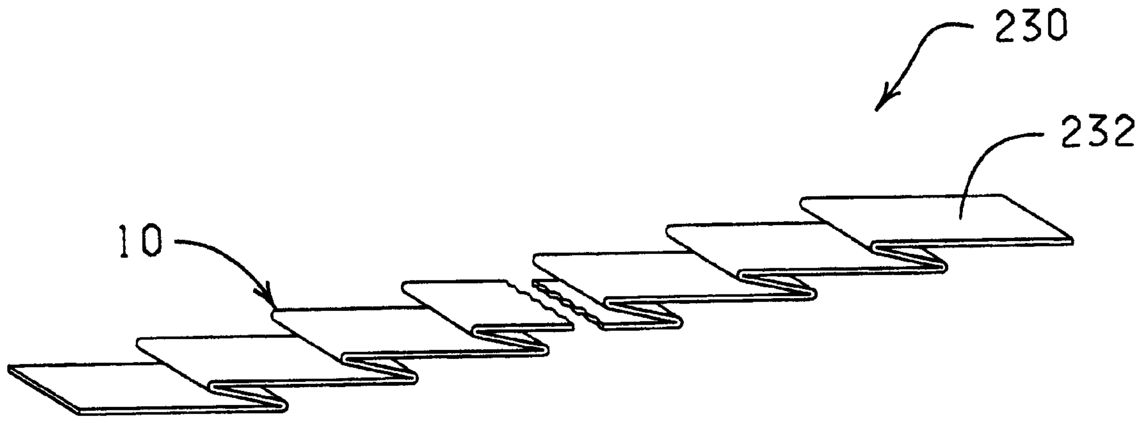
FIG. 20 is a perspective view of a folded corrugated ribbon material.

The folded corrugated sheets of material 10 and 10*a* can be produced from a sheet or web of substantially flat material 32 (See FIG. 2A) that is capable of being creased, which is capable of being folded to form the folded corrugated material 10 or 10*a*, and which can be employed to provide a decorative segment for use as Easter grass or a packing material (FIGS. 3A and 3B), or to form a cover for a floral grouping (FIGS. 4 through 7), or a decorative cover for a flower pot (FIG. 8), or a preformed flower pot cover for covering a flower pot (FIGS. 10 and 11), or a sleeve for wrapping or covering a floral grouping (FIGS. 13 through 16) or a flower pot (FIGS. 17 through 19), or a ribbon (FIG. 20). Examples of such material are paper (untreated or treated in any manner), cellophane, foil, polymeric film or any combination thereof, including laminates such as paper and polymeric film laminates, polymeric film laminates, foil and paper laminates, foil and polymeric film laminates and the like.

The sheet or web of material 32 may also vary in color. Further, the sheet or web of material 32 may consist of designs which are printed, etched, and/or embossed; and in addition, the sheet or web of material 32 may have various colorings, coatings, flockings, and/or metallic finishes (i.e., a metallized film), or be characterized totally or partially by pearlescent, translucent, transparent, iridescent, or the like characteristics. Each of the above-named characteristics may occur alone or in combination.

At least one surface of the sheet or web of material 32 may be modified to provide the sheet or web of material 32 with a matte or textured finish assimilating the appearance of cloth. The modification of the sheet or web of material 32 to provide the same with a matte or textured finish can be accomplished in several ways. For example, a matte finish can be provided by printing a desired pattern on the sheet or web of material 32 and thereafter laminating a matte material, such as a translucent polymeric film over the printed pattern. To further enhance the cloth-like appearance of the sheet or web of material 32, the matte material may or may not have a plurality of spatially disposed holes extending therethrough. A matte or textured finish can also be produced by printing the sheet or web of material 32 with a matted (i.e. dull finish) ink, by lacquering at least one surface of the sheet or web of material 32 with a dull finish lacquer or a matting lacquer, by embossing the sheet or web of material 32 to provide an embossed pattern simulating the weave or texture of cloth, or by embossing and printing the sheet or web of material 32 to provide. embossed and printed patterns wherein the embossed and printed patterns may be in registry, out of registry, or wherein a portion of the embossed and printed patterns are in registry and a portion of the embossed and printed patterns are out of registry. In addition, a matte or textured finish capable a providing the sheet or web of material 32 with a cloth-like appearance can be achieved by extruding a resin onto a matted or textured chill roll or by laminating a second sheet of material to the sheet or web of material 32.

The sheet of folded corrugated material 10 or 10*a* used to form a flower pot cover can be of any shape, configuration or size as long as the sheet of folded corrugated material 10 or 10*a* is sufficiently sized and shaped to wrap and encompass a floral grouping or a flower pot. That is, the sheet of folded corrugated material 10 or 10*a* may have a square, rectangular, round, oval, octagonal or asymmetrical shape. Further, multiple sheets of the folded corrugated material 10 or 10*a* may be used in a single circumstance to provide a decorative cover or sleeve for a floral grouping or a flower pot. Moreover, when multiple sheets of material are used to form the folded corrugated material 10 or 10*a*, the sheets of material need not be uniform in size or shape.

The thickness or stiffness of the sheet or web of material 32 employed in the production of the folded corrugated materials 10 and 10*a* can vary widely as long as the sheet of folded corrugated material 10 or 10*a* can be wrapped about at least a portion of a floral grouping or a flower pot, as described herein. Generally, the sheet of folded corrugated material 10 or 10*a* will have a thickness of from about 0.1 mil to about 30 mil, and more desirably a thickness of from about 0.5 mil to about 2.5 mil.

As noted above, the sheet of folded corrugated material 10 or 10*a* can be utilized to form a decorative cover for a floral grouping or a flower pot. The term "flower pot" as used herein refers to any type of container for holding a floral grouping, or a plant, or even another pot type container. Examples of flower pots and/or pot type containers include, but are not limited to, clay pots, wooden pots, plastic pots, pots made from natural and/or synthetic fibers, or any combination thereof. Such flower pots and or pot-type containers are provided with a retaining space for receiving a floral grouping. The floral grouping may be disposed within the retaining space of the flower pot with a suitable growing medium described in further detail below, or other retaining medium, such as a floral foam. It will also be understood that in some cases the floral grouping, and any appropriate growing medium or other retaining medium, may be disposed in a sleeve formed from the sheet of folded corrugated material 10 if the sleeve is adapted to contain a medium.

"Floral grouping" as used herein means cut fresh flowers, artificial flowers, a single flower or other fresh and/or artificial plants or other floral materials and may include other secondary plants and/or ornamentation or artificial or natural materials which add to the aesthetics of the overall floral grouping. Further, the floral grouping may comprise a growing potted plant having a root portion as well. However, it will be appreciated that the floral grouping may consist of only a single bloom or only foliage, or a botanical item (not shown), or a propagule. The term "floral grouping" may be used interchangeably herein with the term "floral arrangement". The term "floral grouping" may also be used interchangeably herein with the terms "botanical item" and/or "propagule."

The term "growing medium" when used herein means any liquid, solid or gaseous material used for plant growth or for the cultivation of propagule, including organic and inorganic materials such as soil, humus, perlite, vermiculite, sand, water, and including the nutrients, fertilizers or hormones or combinations there of required by the plants or propagules for growth.

The term "botanical item" when used herein means a natural or artificial herbaceous or woody plant, taken singularly or in combination. The term "botanical item" also means any portion or portions of natural or artificial herbaceous or woody plants including stems, leaves, flowers, blossoms, buds, blooms, cones, or roots, taken singly or in combination, or in groupings of such portions such as bouquet or floral grouping.

The term "propagule" when used herein means any structure capable of being propagated or acting as an agent of reproduction including seeds, shoots, stems, runners, tubers, plants, leaves, roots or spores.

A system for producing the folded corrugated materials 10 and 10*a* and the use of the sheet of folded corrugated material 10 to produce the strips or segments 46 and 48 (FIGS. 3A and 3B) or the use of the folded corrugated materials 10 and 10*a* to form a decorative cover for a floral grouping or a flower pot, or to form a sleeve for a floral grouping or a flower pot, or to form a preformed flower pot cover, or to provide a ribbon material will be described in more complete detail herein.

Figure 3A:
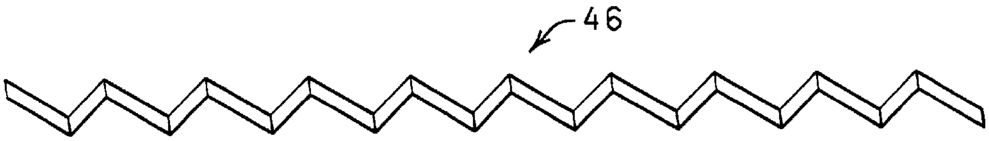
FIG. 3A is a perspective view of a decorative segment produced from the folded corrugated sheet of FIG. 1A when the sheet of folded corrugated material is cut at an angle to the line of folds.
Figure 3B:
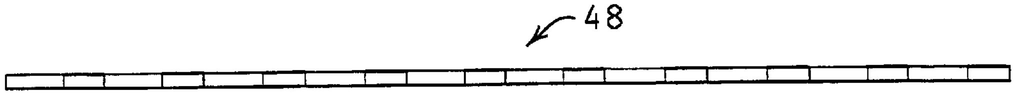
FIG. 3B is a top plan view of a decorative segment produced from the folded corrugated sheet of FIG. 1A when the sheet of folded corrugated material is cut transversely to the line of folds.
Figure 2A:
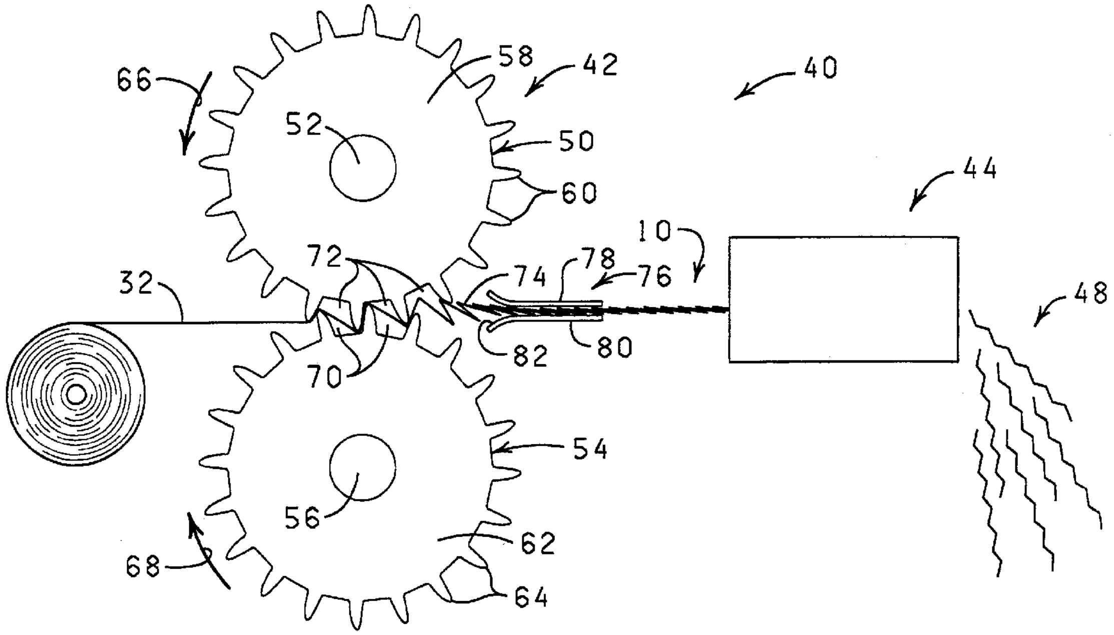
FIG. 2A is a schematic representation of a system for producing the folded corrugated material of FIGS. 1A and 1B having a shredding assembly associated therewith for cutting the folded corrugated material into decorative segments.
Figure 2B:
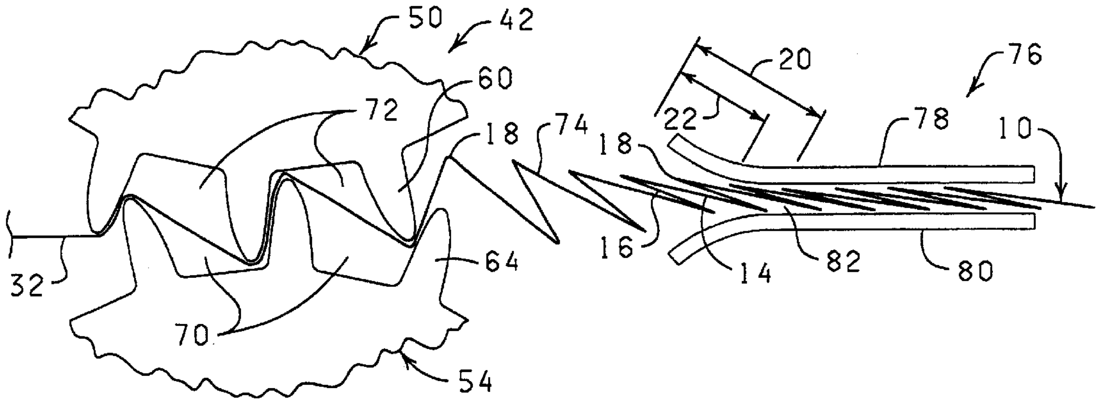
FIG. 2B is an enlarged fragmental view of a corrugating assembly and a folding assembly of the system of FIG. 2A for producing the folded corrugated material of FIGS. 1A and 1B.
Figure 2C:
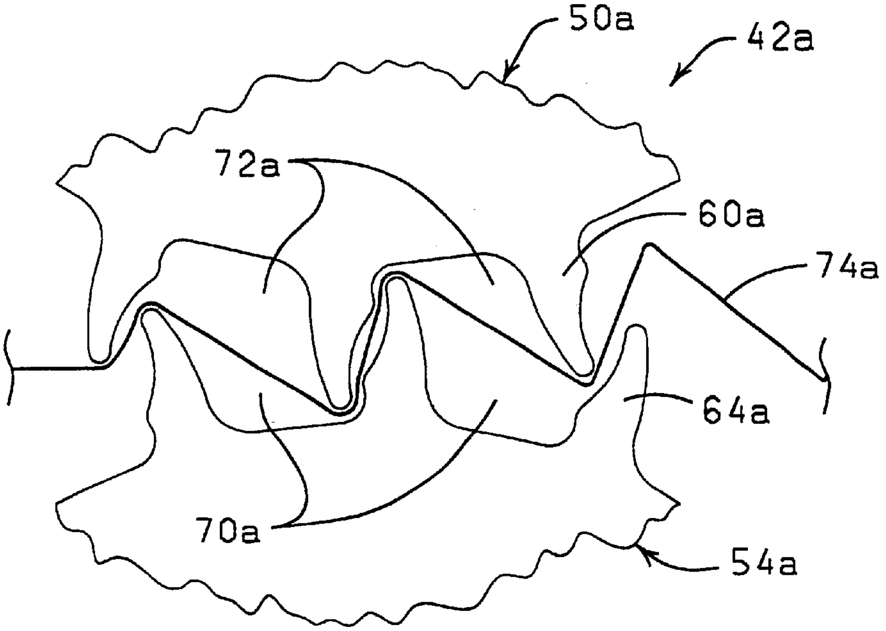
FIG. 2C is an enlarged fragmental view of another embodiment of a corrugating assembly for use in the system of FIG. 2A.

Referring now to FIGS. 2A–2C, designated generally by the reference numeral 40 is a system for producing the folded corrugated materials 10 and 10*a* of FIGS. 1A and 1B from the sheet or web of substantially flat material 32. The system 40, which includes a corrugating assembly 42, is shown as including a shredding assembly 44 for cutting the sheet of folded corrugated material 10 produced by passage of the sheet or web of material 32 through the corrugating assembly 42 into segments or strips of material, such as the segments or strips of material 46 and 48 as illustrated in FIGS. 3A and 3B, respectively. The segments or strips of material 46 and 48 can be used as a decorative grass (i.e. Easter grass) or as an animal bedding material, cat litter, a mulch or a media for plants.

It should be noted that when using the folded corrugated material 10 produced from a sheet of the substantially flat material 32, the shredding assembly 44 may only be required to cut the sheet of folded corrugated material 10 into strips of material which have a length determined by the dimensions of the folded corrugated material 10. However, when the folded corrugated material 10 is produced from a web of material 32, the shredding assembly 44 comprises a slitting unit for slitting the folded corrugated material 10 and a cutting or chopper unit for cutting the slit folded corrugated material into segments.

Referring more specifically to FIGS. 2A and 2B, the corrugating assembly 42 comprises a first corrugation forming member 50 rotatably mounted on a shaft 52 and a second corrugation forming member 54 rotatably mounted on a shaft 56. The first corrugation forming member 50 is provided with a body member 58 having a substantially circular cross-sectional configuration and a plurality of outwardly extending, equally spaced finger members or teeth 60 extending therefrom so as to be disposed about the periphery of the body member 58 substantially as shown. The second corrugation forming member 54 is likewise provided with a body member 62 having a substantially circular cross-sectional configuration and a plurality of outwardly extending, equally spaced finger members or teeth 64 disposed about the periphery of the body member 62 substantially as shown. The first and second corrugation forming members 50 and 54 are mounted such that, upon rotation of the first corrugation forming member 50 in a counterclockwise direction as indicated by the arrow 66 and rotation of the second corrugation forming member 54 in a clockwise direction as indicated by the arrow 68, the finger members or teeth 60 of the first corrugation forming member 50 are positionable in recess 70 formed between the finger members or teeth 64 of the second corrugation forming member 54, and the finger members or teeth 64 of the second corrugation forming member 54 are positionable within recess 72 formed between the finger members or teeth 60 of the first corrugation forming member 50 substantially as shown. The rotation of the first and second corrugation forming members 50 and 54 on the shafts 52 and 56, respectively, is such that the finger members or teeth 60 of the first corrugation forming member 50 are offset relative to the recesses 70 formed between the finger members or teeth 64 of the second corrugation forming member 54 and the finger members or teeth 64 of the second corrugation forming member 54 are off set relative to a central point of the recess 72 formed between the finger members or teeth 60 of the first corrugation forming member 50. Further, the first and second corrugation forming members 50 and 54 are spatially disposed sufficient to permit passage of the sheet or web of material 32 therebetween during the formation of corrugations therein. By changing the timing, i.e., the position of the finger members or teeth 60 of the first corrugation forming member 50 relative to the recesses 70 of the second corrugation forming member 54, the finger members or teeth 60 of the first corrugation forming member 50 are positioned closer to one side of the finger members or teeth 64 of the second corrugation forming member 54 such that upon passage of the sheet or web of material 32 therebetween the crease 18 is formed in the sheet or web of material 32 and the finger members or teeth 60 and 64 of the first and second corrugation forming members 50 and 54 together with movement of the sheet or web of material 32 through the recesses 72 and 70 of the first and second corrugation forming members 50 and 54 create a substantially 90 degree bend in the sheet or web of material 32 and thereby produces a corrugated sheet or web of material 74. As previously state, passages of the sheet or web of material 32 between the first and second corrugation forming members 50 and 54 produces the corrugated sheet or web of material 74 wherein one leg of each corrugation is provided with a length greater than the length of the second leg of each corrugation substantially as shown in FIG. 2B.

Any suitable apparatus can be employed as the first and second corrugation forming members 50 and 54 which is capable of forming a crease in the sheet or web of material 32 and forming a bend in the sheet or web of material 32 as same passes between the first and second corrugation forming members 50 and 54. For instance, the first and second corrugation forming members 50 and 54 can be spur gears which are modified such that the distal end of each of the teeth of the spur gears forms a single crease in the sheet or web of material when same is passed between the first and second corrugation forming members 50 and 54, and such gears can be driven by the shafts 52 and 56 which are connected to two helical gears which are capable of changing the timing of the spur gears in order to obtain the desired relationship between the first and second corrugation forming members 50, 54 so as to produce the corrugated sheet or web of material 74 wherein one leg of each corrugation is longer than the other leg of each corrugation.

To enhance folding of the corrugations of the corrugated sheet or web of material 74 to provide the folded corrugated material 10 or 10*a* (as shown in FIGS. 1 and 1A), wherein each of the folds overlays an adjacently disposed fold, the system 40 further includes a folding assembly 76. The folding assembly 76 comprises a pair of spatially disposed arm members 78 and 80 defining a passageway 82 therebetween. Thus, as the corrugated sheet or web of material 74 is drawn between the first and second corrugation forming members 50 and 54 and fed into the passageway 82 formed between the first and second arm members 78, 80 of the folding assembly 76, the corrugations of the corrugated sheet or web of material 74 are caused to fold over one another so that each of the folds overlays an adjacently disposed fold and produces the sheet of folded corrugated material 10 or 10*a* illustrated in FIGS. 1A and 1B.

The sheet of folded corrugated material 10 or 10*a* can then be cut into sheets for use in the formation of decorative covers for floral groupings or flower pots, or the sheet of folded corrugated material 10 or 10*a* can be fed through the shredding assembly 44 wherein the sheet of folded corrugated material 10 or 10*a* is cut into strips or segments of material 46, 48 having a predetermined width and length to produce decorative grass segments 46 (FIG. 3A) or decorative grass segments 48 (FIGS. 2A and 3B).

To produce the strip of material 46 depicted in FIG. 3A which has a three-dimensional configuration, the sheet of folded corrugated material 10 or 10*a* is cut in an angular direction (i.e. obliquely to the machine direction) as indicated by the arrow 84 in FIG. 1A. The degree of angle at which the sheet of folded corrugated material 10 or 10A is, cut to produce the strips of material 46 can vary widely but generally will be about 45 degrees. On the other hand, to produce the strip of material 48 illustrated in FIG. 3B, the sheet of folded corrugated,material 10 or 10A is cut transversely to the line of folds, i.e., in the machine direction, as indicated by the arrow 86.

Any conventional device and method can be employed as the shredding assembly 44 for slitting the sheet of folded corrugated material 10 or 10A into, a plurality of strips of predetermined width and/or for cutting the strips of the sheet of folded corrugated material 10 or 10A to form the corrugated decorative grass in accordance with the present invention. Examples of conventional devices which can be used as the shredding assembly 44, including a device for slitting the sheet of folded corrugated material 10 or 10A and thereafter, if required, cutting the slit material into segments, are rotary knives, reciprocating knives, die cutting, laser cutting, water jet cutting, air jet cutting and the like.

Another embodiment of a corrugation assembly 42*a* is illustrated in FIG. 2C for producing a corrugated sheet or web of material 74*a* which, upon subsequent passage through the folding assembly 76 produces a sheet of folded corrugated material similar to the sheet of folded corrugated materials 10 and 10*a*. In this embodiment, the corrugation assembly 42*a* comprises a first corrugation forming member 50*a* and a second corrugation forming member 54*a* which are substantially identical in configuration and function as the first and second, corrugation forming members 50 and 54 hereinbefore described except for the configuration of the finger members or teeth 60*a* and the recesses 72*a* of the first corrugation forming member 50*a* and the finger members or teeth 64*a* and recesses 70*a* of the second corrugation forming member 54*a*. With such exceptions, the corrugation assembly 42*a* is substantially identical to the corrugation assembly 42 hereinbefore described, as is its operation.

Figure 2D:
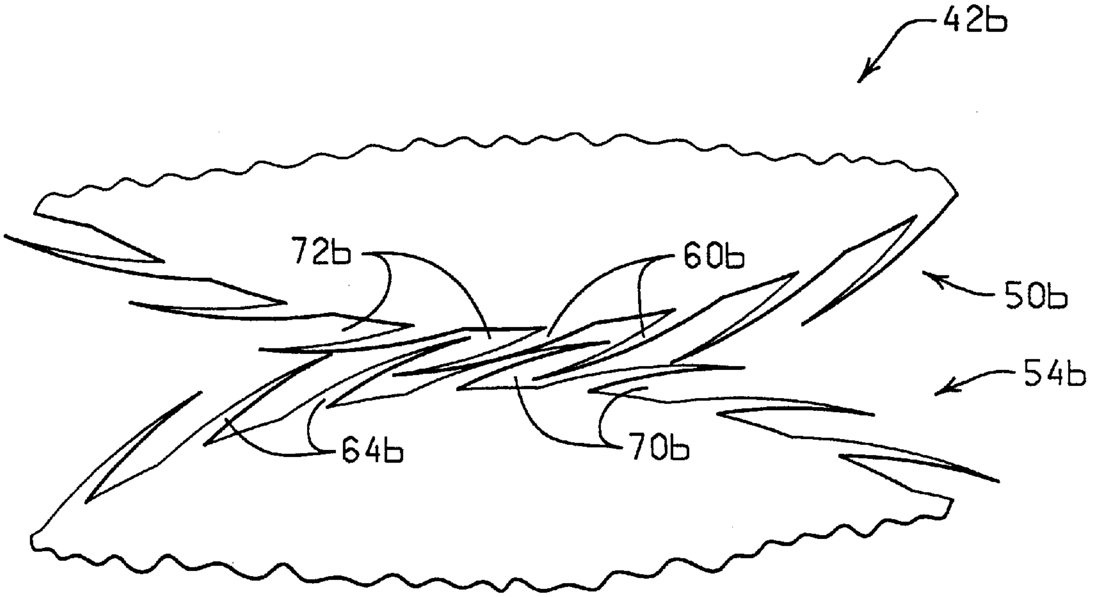
FIG. 2D is an enlarged fragmental view of yet another embodiment of a corrugating assembly for use in the system of FIG. 2A.

Another embodiment of a corrugation assembly 42*b* is illustrated in FIG. 2D for producing a corrugated sheet or web of material (not shown) which, upon subsequent passage through the folding assembly 76 produces a sheet of folded corrugated material similar to the sheets of folded corrugated materials 10 and 10*a*. In this embodiment, the corrugation assembly 42*b* comprises a first corrugation forming member 50*b* and a second corrugation forming member 54*b* which are substantially identical in configuration and function as the first and second corrugation forming members 50 and 54 hereinbefore described except for the configuration of the finger members or teeth 60*b* and the recesses 72*b* of the first corrugation forming member 50*b* and the finger members or teeth 64*b* and recesses 70*b* of the second corrugation forming member 54*b*. With such exceptions, the corrugation assembly 42*b* is substantially identical to the corrugation assembly 42 hereinbefore described, as is its operation.

Figure 2E:
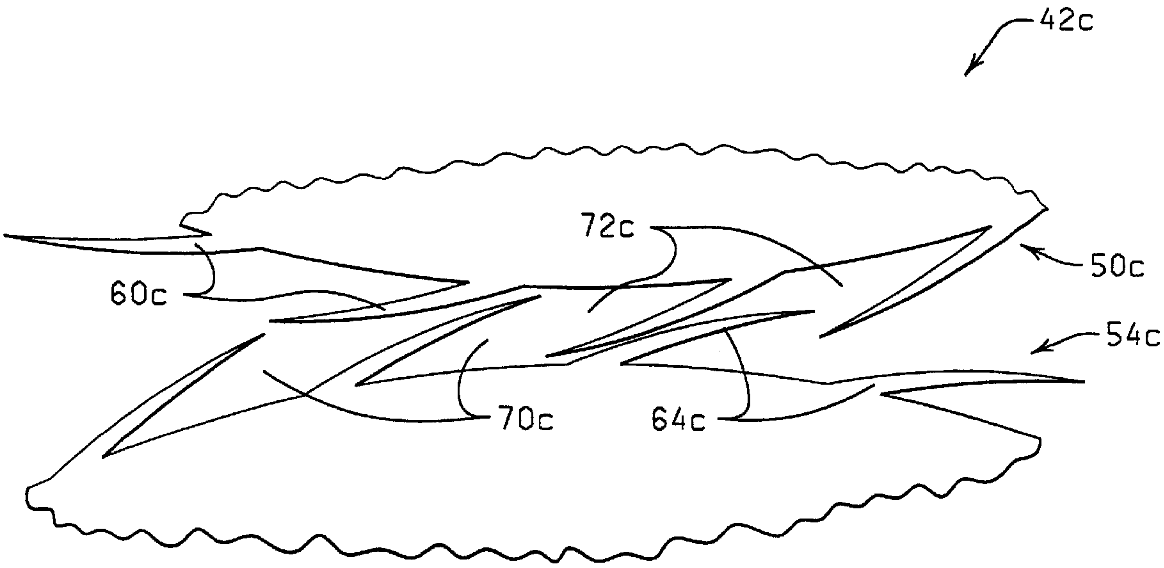
FIG. 2E is an enlarged fragmental view of yet another embodiment of a corrugating assembly for use in the system of FIG. 2A.

Another embodiment of a corrugation assembly 42*c* is illustrated in FIG. 2E for producing a corrugated sheet or web of material, (not shown) which, upon subsequent passage through the folding assembly 76 produces a sheet of folded corrugated material similar to the sheets of folded corrugated materials 10 and 10*a*. In this embodiment, the corrugation.assembly 42*c* comprises a first corrugation forming member 50*c* and a second corrugation forming member 54*c* which are substantially identical in configuration and function as the first and second corrugation forming members 50 and 54 hereinbefore described except for the configuration of the finger members or, teeth 60*c* and, the recesses 72*c* of the first corrugation forming member 50*c* and the finger members or teeth 64*c* and recesses 70*c* of the second corrugation forming member 54*c*. With such exceptions, the corrugation assembly 42*c* is substantially identical to the corrugation assembly 42 hereinbefore described, as is its operation.

Figure 4:
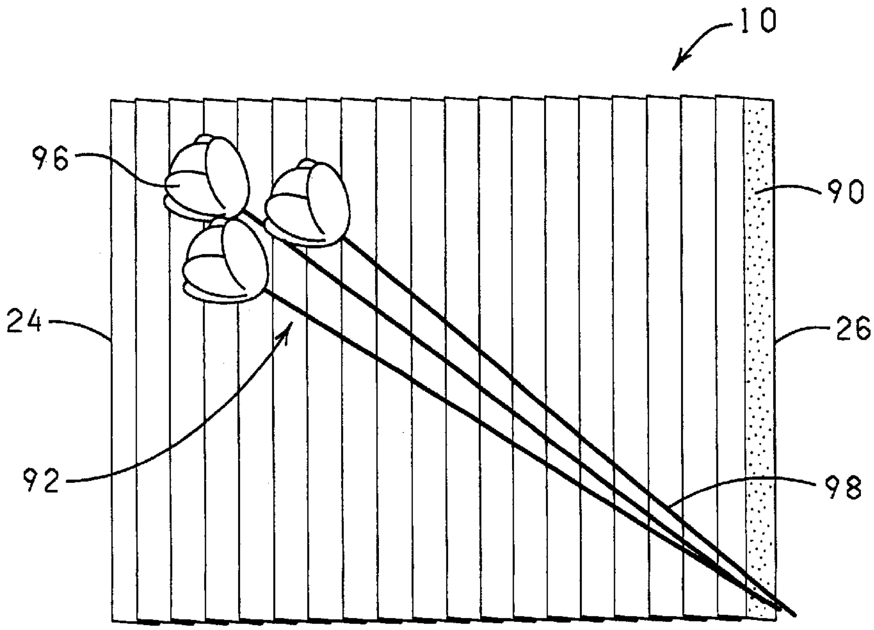
FIG. 4 is a perspective view of a sheet of folded corrugated material constructed in accordance with the present invention having a floral grouping disposed thereon.
Figure 5:
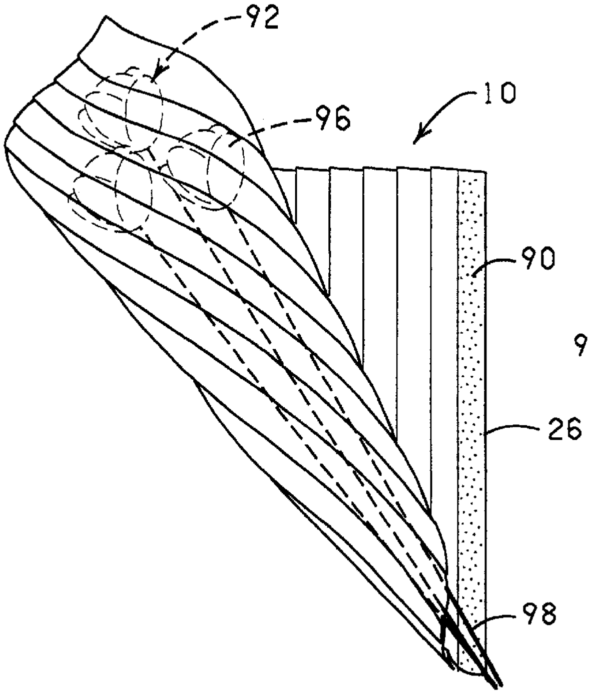
FIG. 5 is a perspective view of the floral grouping of FIG. 4 being wrapped with a sheet of folded corrugated material of the present invention by one method of wrapping.
Figure 6:
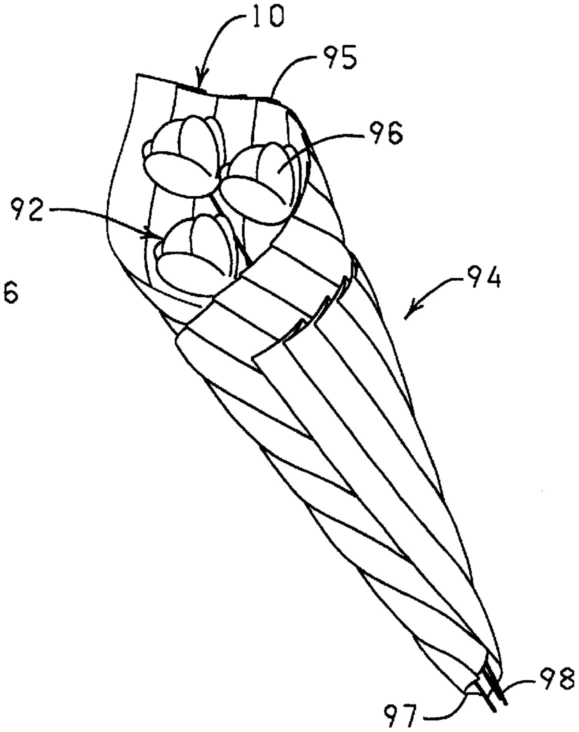
FIG. 6 is a perspective view of a decorative cover for the floral grouping formed from a sheet of folded corrugated material of the present invention wherein the decorative cover formed from the sheet of folded corrugated material has a conical configuration.

FIGS. 4–6 illustrate the use of the sheet of folded corrugated material 10 having a strip of bonding material 90 disposed substantially adjacent the second end 26 there of for wrapping a floral grouping 92 to provide a decorative cover 94 (FIG. 6) for the floral grouping 92. Further, the sheet of folded corrugated material 10 can be provided either as an individual sheet or from a pad or as a roll of material.

In operation, an operator may dispose the sheet of folded corrugated material 10 on a support surface (not shown). The floral grouping 92 is placed upon the sheet of folded corrugated material 10 in a diagonal orientation. The floral grouping 92 has an upper bloom or foliage portion 96 and a lower stem portion 98. The sheet of folded corrugated material 10 is then wrapped about the floral grouping 92 (FIGS. 5 and 6) by overlapping a portion of the sheet of folded corrugated material 10 over another portion of the sheet of folded corrugated material 10. That is, for example, an operator places the first end 24 of the sheet of folded corrugated material 10 over the floral grouping 92, as shown in FIG. 5. The operator continues to roll the floral grouping 92 and the sheet of folded corrugated material 10 in the direction toward the second end 26 of the sheet of folded corrugated material 10 until the floral grouping 92 is substantially encompassed by the sheet of folded corrugated material 10 wherein the bonding material 90 contacts the sheet of folded corrugated material 10 to provide the decorative cover 94 which substantially encompasses and surrounds a substantial portion of the floral grouping 92. FIG. 6 shows the floral grouping 92 wrapped in a conical fashion to provide the decorative cover 94 for the floral grouping 92. When the floral grouping 92 is wrapped in a conical fashion, the bloom portion 96 of the floral grouping 92 is exposed adjacent an open upper end of the decorative cover 94 and the stem portion 98 exposed adjacent a lower end 97 of the decorative cover 94.

Figure 7:
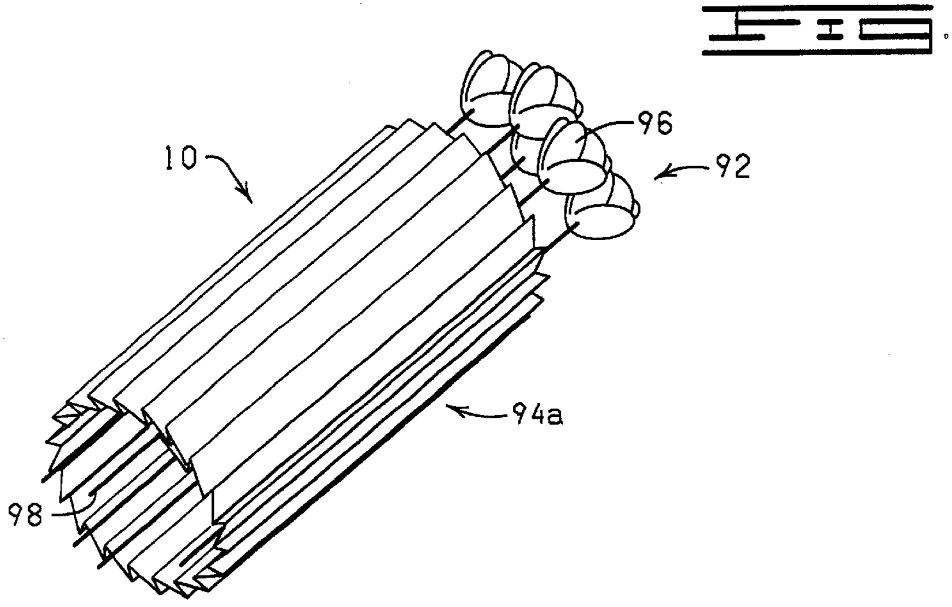
FIG. 7 is a perspective view of a decorative cover formed from a sheet of folded corrugated material of the present invention wherein a floral grouping is wrapped with a sheet of folded corrugated material by a second method of wrapping so that the decorative cover formed from the sheet of folded corrugated material has a substantially cylindrical configuration.

In another embodiment, illustrated in FIG. 7, the sheet of folded corrugated material 10 is utilized to wrap the floral grouping 92 in a cylindrical fashion. The floral grouping 92 is disposed upon the sheet of folded corrugated material 10 approximately parallel to one side of the sheet of folded corrugated material 10. The sheet of folded corrugated material 10 is then wrapped generally about the stem portion 98 of the floral grouping 92 to a position wherein the sheet of folded corrugated material 10 generally overlaps the opposite side of the sheet of folded corrugated material 10 in a cylindrical fashion. It should be noted that the sheet of folded corrugated material 10 may be wrapped a plurality of times about the stem portion 98 of the floral grouping 92. As before, one portion of the sheet of folded corrugated material 10 near the one side there of is disposed generally adjacent another portion of the sheet of folded corrugated material 10 and the two adjacent portions then are brought into contact where they may be bondingly engaged, thereby securing the sheet of folded corrugated material 10 generally about the floral grouping 92 so as to provide a decorative cover 94*a* for the floral grouping 92 (FIG. 7) It should be understood that the sheet of folded corrugated material 10*a* hereinbefore described can also be employed to form the decorative covers 94 and 94*a*.

Figure 8:
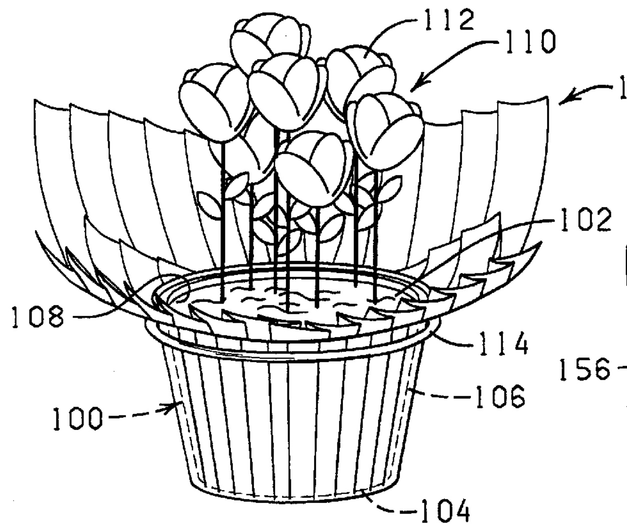
FIG. 8 is perspective view of a decorative cover positioned about a flower pot wherein the decorative cover is formed from a sheet of the folded corrugated material constructed in accordance with the present invention.

In another version of the invention the sheet of folded corrugated material 10 may be used to wrap a flower pot or pot-type container, as noted above. Shown in FIG. 8 is a flower pot designated by the reference numeral 100 and which wrap a flower pot or pot type container has an open upper end 102, a bottom end 104, an outer peripheral surface 106, an inner retaining space 108 within which may be disposed a growing medium. The flower pot 100 may contain a botanical item, such as a plant 110, which has an upper portion 112 comprising blooms or foliage or both.

The sheet of folded corrugated material 10 may be wrapped about the flower pot 100 by any one of numerous methods used to wrap sheets of material about flower pots to form decorative pot covers for flower pots, such as a.decorative cover 113 disposed about the flower pot 100 as illustrated in FIG. 8. The sheet of folded corrugated material 10 may, for example, be formed by hand about the outer peripheral surface 106 of the flower pot 100 to produce the decorative cover 113. The decorative cover 113 can then be secured about the flower pot 100 by a bonding material (not shown) or by an elastic band 114 such that the open upper end 102 of the flower pot 100 remains substantially uncovered by the decorative cover 113 substantially as shown in FIG. 8.

Figure 9:
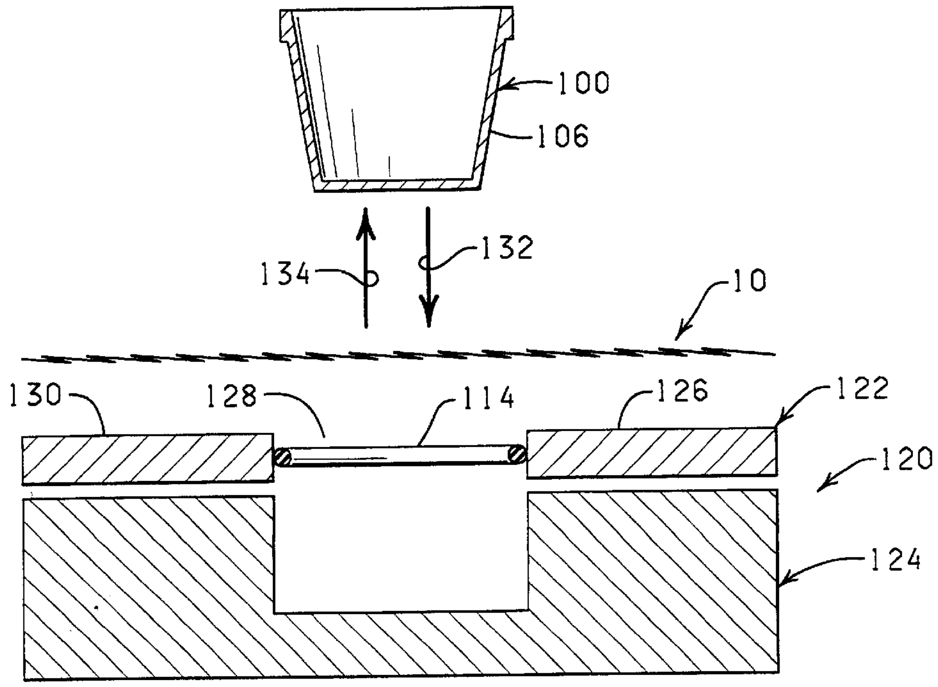
FIG. 9 is a cross-sectional view of a flower pot cover former and band applicator apparatus having a sheet of the folded corrugated material constructed in accordance with the present invention disposed above an opening of the flower pot cover former and band applicator and having a flower pot disposed above the sheet of folded corrugated material.

Referring now to FIG. 9, a flower pot cover former and band applicator apparatus 120 for forming the sheet of folded corrugated material 10 into the decorative cover 113 for the flower pot 100 of FIG. 8 is illustrated. The flower pot cover former and band applicator apparatus 120 comprises a band applicator 122 and a flower pot cover former 124. The flower pot cover former and band applicator apparatus 120 has a support platform 126 with an opening 128 formed therein. A band, such as elastic band 114, is disposed circumferentially about the opening 128 in the support platform 126.

The sheet of folded corrugated material 10 is positioned on an upper surface 130 on the support platform 126 such that the sheet of folded corrugated material 10 is positioned over the opening 128 in the support platform 126. The flower pot 100 is positioned above the sheet of folded corrugated material 10 and is moved in a direction 132 into the opening 128 of the flower pot cover former and band applicator apparatus 120. As the flower pot 100 is moved into the opening 128, the sheet of folded corrugated material 10 is pressed about the outer peripheral surface 106 of the flower pot 100 thereby forming the decorative cover 113 about the flower pot 100. The decorative cover 113 is then secured about the flower pot 100 by the elastic band 114. The flower pot 100 having the decorative cover 113 secured thereto is then moved in a direction 134 out of the opening 128 in the support platform 126.

The elastic band, 114 can be applied, manually or automatically such as by the method shown in U.S. Pat. No. 5,105,599 which is hereby incorporated herein by reference. The elastic band 114 can also be applied as a tie using a method such as described in “Single Station Covering and Fastening System”, U.S. Ser. No. 08/252,876, the specification of which is hereby incorporated herein by reference. The sheet of folded corrugated material 10 can also be applied automatically about the flower pot 100, for example, by methods shown in U.S. Pat. Nos. 4,733,521and 5,291,721, both of which are hereby incorporated herein by reference.

Instead of securing, the decorative cover 113 about the flower pot 100 via the elastic band 114, the decorative cover 113 formed from the sheet of folded corrugated material 10 may be secured to the flower pot 100 by the use of one or more bonding materials. For example, the sheet of folded corrugated material 10 may have a bonding material disposed upon a portion thereof. When the sheet of folded corrugated material 10 is disposed about the flower pot 100, at least a portion of the sheet of folded corrugated material 10 contacts the outer peripheral surface 106 of the flower pot 100 and is thereby bonded and held about the flower pot 100 via the bonding material.

The bonding material may cover a portion of one surface of the sheet of folded corrugated material 10, or the bonding material may entirely cover one surface of the sheet of folded corrugated material 10. The bonding material may be disposed on the surface of the sheet of folded corrugated material 10 in the form of a strip or in the form of spaced-apart spots. One method for disposing a bonding material on the sheet of folded corrugated material 10 is described in U.S. Pat. No. 5,111,637, entitled “Method For Wrapping A Floral Grouping”, issued to Weder, et al. on May 12, 1992, which is expressly incorporated herein by reference.

Figure 10:
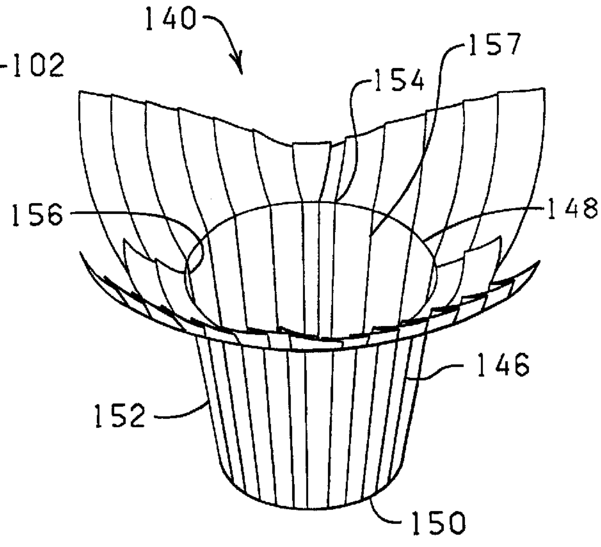
FIG. 10 is a perspective view of a preformed pot cover formed from a sheet of the folded corrugated material constructed in accordance with the present invention.
Figure 11:
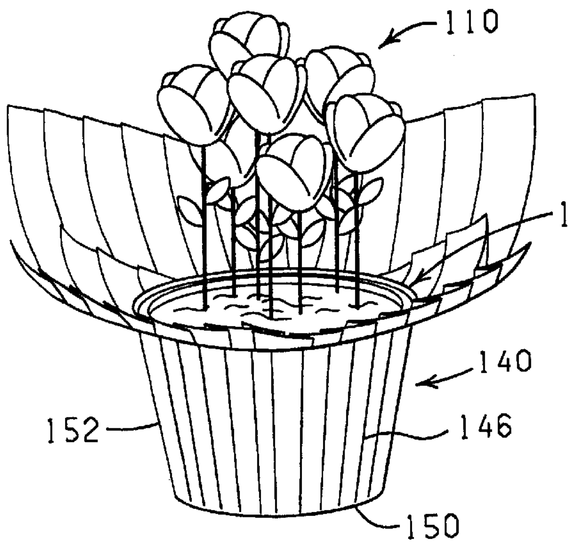
FIG. 11 is a perspective view of the preformed pot cover of FIG. 10 having a flower pot disposed therein.

Referring now to FIGS. 10 and 11, a decorative preformed flower pot cover 140 is illustrated constructed from a sheet of the flexible folded corrugated material 10. It should be understood that the sheet of folded corrugated material 10*a* hereinbefore described can also be employed to form the decorative preformed flower pot cover 140. In one embodiment, the sheet of folded corrugated material 10 used in the construction of the decorative preformed flower pot cover 140 is formed from an expanded core polymeric film having a thickness in the range of from about 0.6 mil to about 10 mil, more desirably in the range of from about 0.6 mil to about 1.25 mil, and a coating of an acrylic heat sealable lacquer is disposed on at least one surface of the expanded core polymeric film. Thus, when the sheet of folded corrugated material 10 is formed into the decorative preformed flower pot cover 140, a plurality of overlapping folds 146 are formed and at least a portion of the overlapping folds 146 are connected to adjacently disposed portions of the decorative preformed flower pot cover 140. via the acrylic heat sealable lacquer. It should be also understood that the folded corrugated material 10 used in the construction of the decorative preformed flower pot cover 140 may be formed from paper (untreated or treated in any manner) cellophane, foil, polymer film or any combination thereof.

The decorative preformed pot cover 140 has an upper end 148, a lower end 150, and an outer peripheral surface 152. An opening 154 intersects the upper end 148, forming an inner peripheral surface 156 which defines and encompasses a retaining space 157 within which a flower pot 100 containing a plant 110 may be disposed in a manner well known in the art and which is shown in FIG. 11.

As previously stated, the decorative preformed flower pot cover 140 may be constructed of a sheet of the folded corrugated material 10, or from a sheet of the folded corrugated material 10*a*, and a bonding material may be disposed on at least a portion of one of the surfaces there of which is capable of connecting at least a portion of the overlapping folds 146 formed in the decorative preformed flower pot cover 140. If desired, the decorative preformed flower pot cover 140 can be formed of a plurality of sheets of the same and/or different types of material. The method and apparatus employed to form the decorative preformed flower pot cover 140 is substantially identical whether one uses one or more sheets of the folded corrugated material 10, or one or more sheets of the folded corrugated material 10*a*, or one or more sheets of a substantially flat material in combination with one or more sheets of the folded corrugated material 10 or 10*a*, or one or more sheets of the folded corrugated material 10 which have a bonding material disposed on at least a portion of one of the surfaces there of or a combination of such sheets of material. Thus, only the formation of the decorative preformed flower pot cover 140 using a sheet of the folded corrugated; material 10 will be described in detail hereinafter.

The decorative preformed flower pot cover 140 may be formed using a conventional mold system 160 comprising a male mold 162 and a female mold 164 having a mold cavity 166 for matingly receiving the, male mold 162. The sheet of folded corrugated material 10 is positioned between the male and female molds 162 and 164, respectively. Movement of the male mold 162 in the direction 168 and into the mold cavity 166 forces the sheet of folded corrugated material 10 to be disposed about the portion of the male mold 162 disposed in the mold cavity 166 of the female mold 164 and thereby forms the sheet of folded corrugated material 10 into the preformed decorative flower pot-cover 140. Further, in accordance with the present invention, the decorative preformed flower pot cover 140 constructed from the materials described hereinabove may have a bonding material disposed upon a portion thereof.

Methods for forming such preformed decorative pot covers, are well known in the art. Two methods of forming such covers are described in U.S. Pat. Nos. 4,773,182 and 5,291,721, each of which is expressly incorporated herein by reference.

Figure 13:
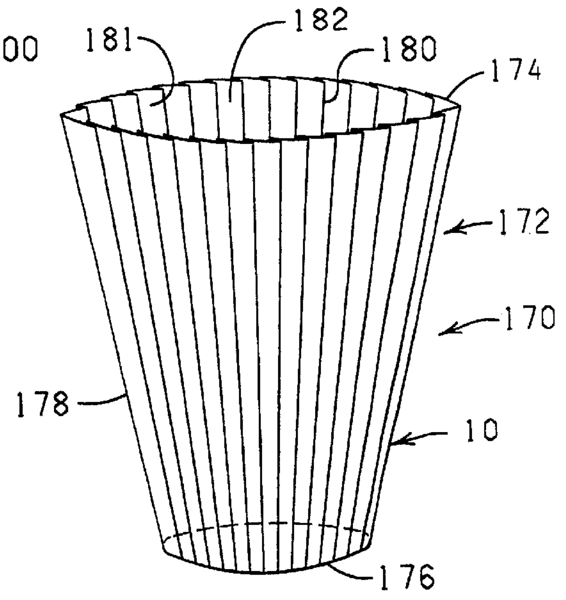
FIG. 13 is a perspective view of a floral sleeve formed from a sheet of the folded corrugated material constructed in accordance with the present invention.
Figure 12:
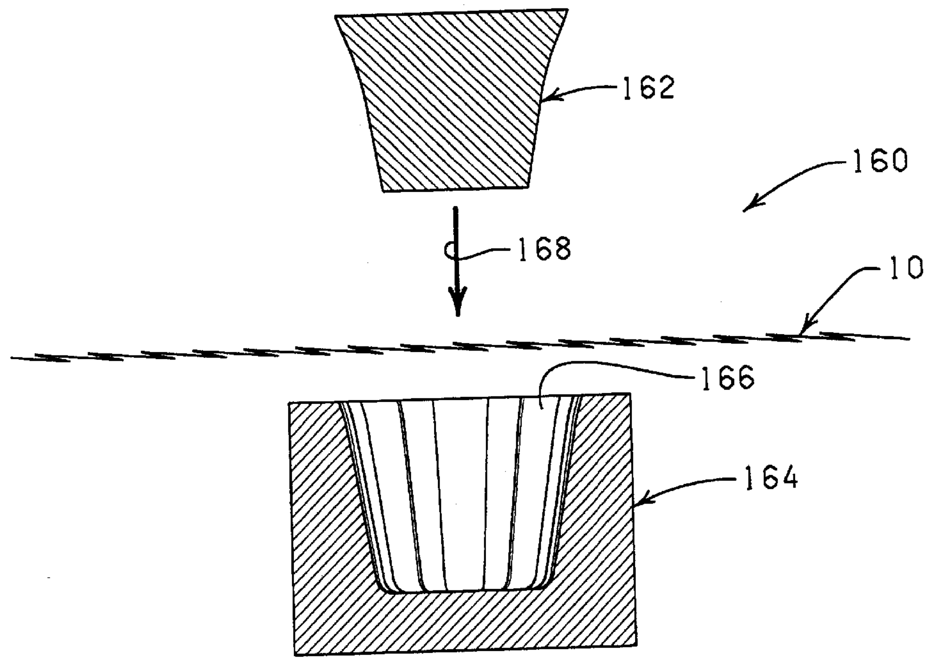
FIG. 12 is a diagrammatic, cross-sectional view of a male and female mold having a sheet of folded corrugated material constructed in accordance with the present invention disposed therebetween for forming the preformed pot cover of FIG. 10.

Shown in FIG. 13 is a decorative cover designated therein by the general reference numeral 170 which comprises a flexible bag or sleeve 172 of unitary construction in accordance with the present invention. The sleeve 172 may be used as a decorative cover for a floral groping or a flower pot. The sleeve 172 initially comprises a flexible flat collapsed piece of folded corrugated material 10 which is openable in the form of a tube or sleeve. Such sleeves are well known in the floral industry. The sleeve 172 has an upper end 174, a lower end 176 and an outer peripheral surface 178. The sleeve 172 may be tapered outwardly from the lower end 176 toward a larger diameter at its upper end 174. In its flattened state the sleeve 172 generally has an overall trapezoidal or modified trapezoidal shape, and when opened is substantially frusto-conical to coniform. It will be appreciated, however, that the sleeve 172 may comprise variations on the aforementioned shapes or may comprise other significantly altered shapes such as square or rectangular, wherein the sleeve 172 when opened has a cylindrical form, as long as the sleeve 172 functions in accordance with the present invention in the manner described herein. The sleeve 172 (or any other sleeve disclosed herein) may have an angular or contoured shape.

The sleeve 172 has an opening 180 at the upper end 174 and may be open at the lower end 176, or closed with a bottom at the lower end 176. The sleeve 172 also has an inner peripheral surface 181 which, when the sleeve 172 is opened, defines and encompasses an inner retaining space 182. When the lower end 176 of the sleeve 172 has a closed lower end 176, a portion of the lower end 176 may be inwardly folded to form one or more gussets (not shown) for allowing the lower portion of the inner retaining space 182 to be expandable, for example, for receiving the circular bottom of a pot or growing medium.

The sleeve 172 is generally frusto-conically shaped, but the sleeve 172 may be, by way of example but not by way of limitation, cylindrical, frusto-conical, a combination of both frusto-conical and cylindrical, or any other shape, as long as the sleeve 172 functions as described herein as noted above. Further, the sleeve 172 may comprise any shape, whether geometric, non-geometric, asymmetrical and/or fanciful as long as it functions in accordance with the present invention. The sleeve 172 may also be equipped with drain holes (if having a closed bottom) or side ventilation holes (note shown) or can be made from gas permeable or impermeable materials.

The material from which the sleeve 172 is constructed is the same as previously described above for the sheet of folded corrugated material 10 or 10*a*. Any thickness of material may be utilized in accordance with the present invention as long as the sleeve 172 may be formed as described herein, and as long as the formed sleeve 172 may contain at least a portion of a flower pot or a floral grouping, as described herein. Additionally, an insulating material such as bubble film, preferably as one of two or more layers, can be utilized in order to provide additional protection for the item, such as the floral grouping, contained therein.

Figure 14:
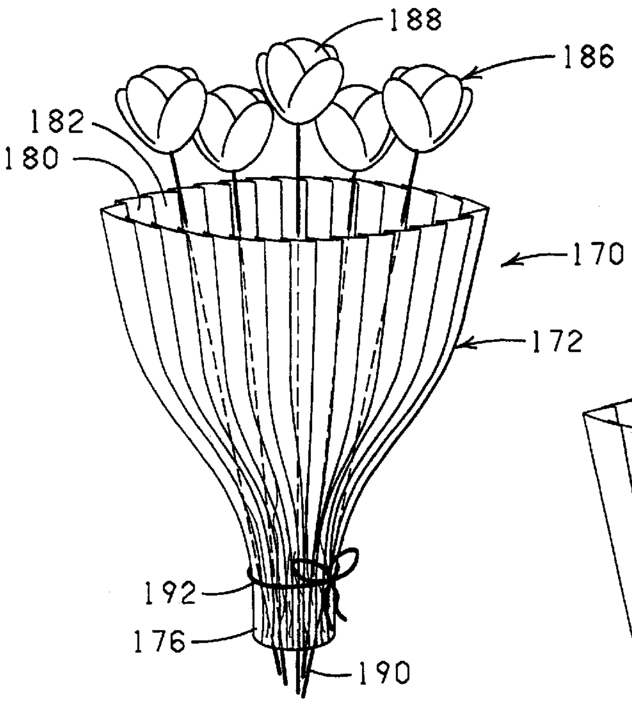
FIG. 14 is a perspective view of the floral sleeve of FIG. 13 disposed about a floral grouping.
Figure 15:
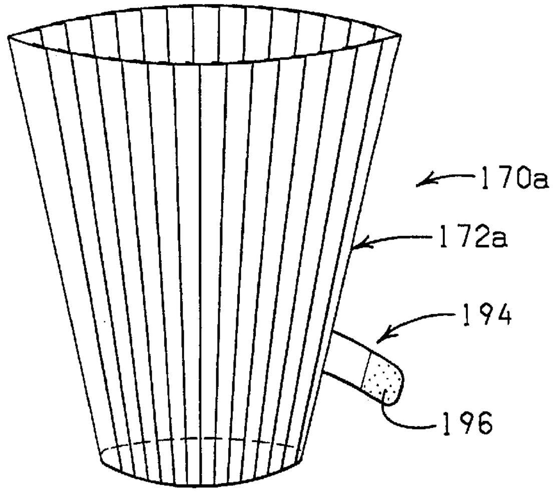
FIG. 15 is a perspective view of a floral sleeve having a cinching member wherein the floral sleeve is formed from a sheet of folded corrugated material constructed in accordance with the present invention.
Figure 16:
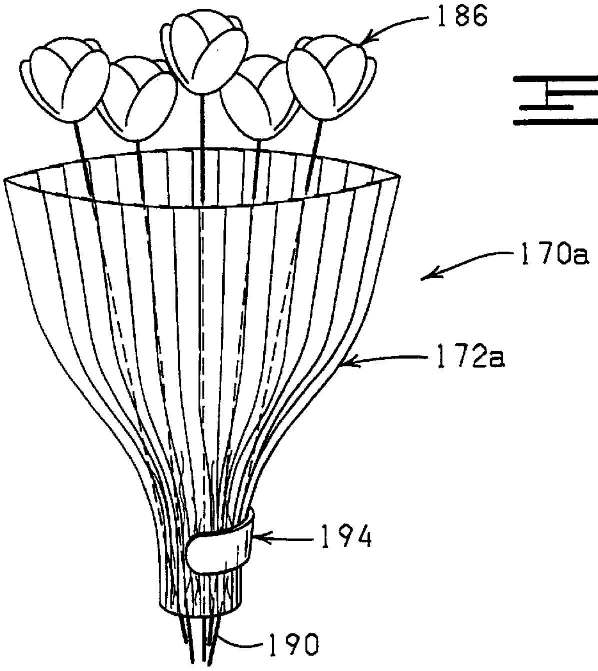
FIG. 16 is a perspective view of the floral sleeve of FIG. 15 disposed about a floral grouping.

In FIG. 14 the sleeve 172 is illustrated as having a floral grouping 186 disposed within the inner retaining space 182 of then sleeve 172. Generally, an upper or bloom portion 188 of the floral grouping 186 is exposed adjacent the opening 180 of the sleeve 172 and a lower or stem portion 190 of the floral grouping 186 is exposed adjacent the lower end 176 of the sleeve 172. Either end of the sleeve 172 may be closed about the floral grouping 186. Generally, a portion of the sleeve 172 is tightened about a portion of the stem portion 190 of the floral grouping 186 for holding the decorative cover 170 about the floral grouping 186. For example, the sleeve 172 may be held by a tie 192 tied about the sleeve 172 such as is shown in FIG. 14. Other materials for binding the sleeve 172 may be employed, such as the bonding materials described elsewhere herein. For example, as shown in FIG. 15, a decorative cover 170*a* is shown which comprises a sleeve 172*a* and a cinching tab 194 having a bonding material 196 disposed upon a surface thereof. The cinching tab 194 can be used to gather portions of the sleeve 172*a* together about the stem portion 190 of the floral grouping 186 as shown in FIG. 16 for holding the sleeve 172*a* tightly about the floral grouping 186.

Similarly, it may generally be desired to use the sleeve 172 as a decorative cover for a flower pot (not shown). The flower pot will generally contain a botanical item or plant. The flower pot can be deposited into the open sleeve 172 in a manner well known in the art, such as manually wherein the sleeve 172 is opened by hand and the flower pot deposited therein.

As noted above, a bonding material may be disposed on a portion of the sleeve 172 or any sleeve described herein to assist in holding the sleeve 172 to the flower pot when the flower pot is disposed within the sleeve 172 or to assist in closing the upper end 174 of the sleeve 172 or adhering the sleeve 172 to the flower pot after the flower pot has been disposed therein, as will be discussed in further detail below.

It will be understood that the bonding material, if present, may be disposed as a strip or block on a surface of the sleeve 172. The bonding material may also be disposed upon either the outer peripheral surface 178 or the inner peripheral surface 181 of the sleeve 172, as well as upon the flower pot. Further, the bonding material may be disposed as spots of bonding material, or in any other geometric, non-geometric, asymmetric, or fanciful form, and in any pattern including covering either the entire inner peripheral surface 181 and/or outer peripheral surface 178 of the sleeve 172 and/or the flower pot. The bonding material may be covered by a cover or release strip which can be removed prior to the use of the sleeve 172 or flower pot. The bonding material can be applied by methods known to those of ordinary skill in the art. One method for disposing a bonding material, in this case an adhesive, is described in U.S. Pat. No. 5,111,637, which is hereby incorporated herein by reference.

As noted above, a bonding material may be disposed on at least a portion of the inner peripheral surface 181 of the sleeve 172 (or any other sleeve described herein), or, alternatively, the bonding material may be disposed on the outer peripheral surface of a flower pot contained within the sleeve 172, while the sleeve 172 may be free of the bonding material. In a further alternative, the bonding material may be disposed both on at least a portion of the flower pot as well as upon at least a portion of the inner peripheral surface 181 of the sleeve 172. In addition, a portion of the bonding material may also be disposed on the outer peripheral surface 178 of the sleeve 172 as well. It will be understood that the bonding material may be disposed in a solid section of bonding material. The bonding material, when present, is disposed on the sleeve 172 and/or flower pot by any means known in the art.

Certain versions of sleeves described herein may be used in combination with a preformed pot cover. For example, a preformed pot cover may be applied to the pot, then the covered pot wrapped or disposed within a sleeve. Either the cover or the sleeve, or both, may be formed from the sheet of folded corrugated material 10. Examples of sleeves which may be used in this invention are shown in the specification of U.S. Pat. No. 5,625,979 which is expressly incorporated herein by reference in its entirety. Equipment and devices for forming sleeves are commercially available, and well known in the art.

Figure 17:
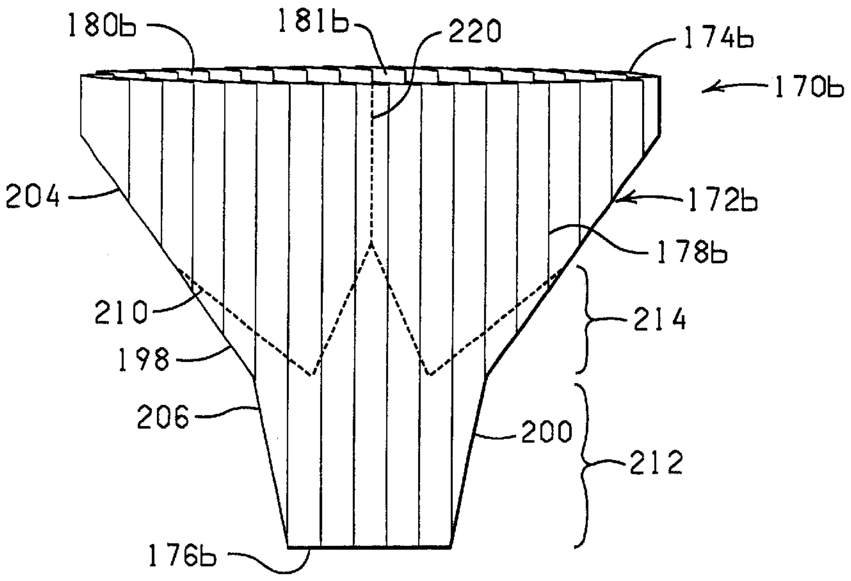
FIG. 17 is a side view of a sleeve having a detachable portion wherein the sleeve is formed from a sheet of folded corrugated material constructed in accordance with the present invention.
Figure 18:
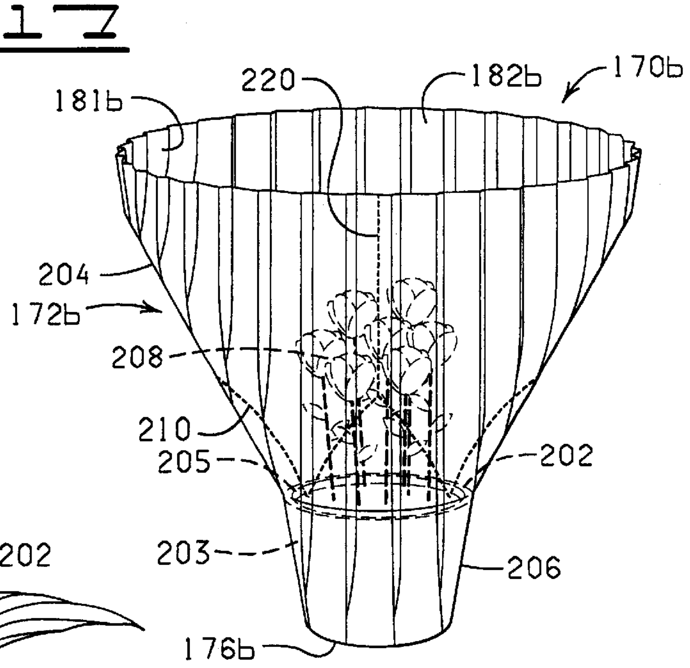
FIG. 18 is a perspective view of the sleeve of FIG. 17 having a flower pot disposed therein.

Shown in FIGS. 17 and 18 is another embodiment of a decorative cover **170*b* comprising a sleeve constructed in accordance with the present invention and designated by the general reference numeral 172*b*. The sleeve 172*b* has a "detaching" element in predetermined areas for detaching a portion of the sleeve 172*b*. The sleeve 172*b* generally initially comprises a flexible flat collapsed piece of folded corrugated material 10 which is openable in the form of a tube or sleeve. The sleeve 172*b*** is constructed of the same material and in the same way as described previously herein and may be described exactly the same as the other sleeves described herein except for the additional elements described hereinafter.

The sleeve **172*b* has an upper end 174*b*, a lower end 176*b*, and an outer peripheral surface 178*b*. The sleeve 172*b* has an opening 180*b* at the upper end 174*b* thereof, and the sleeve 172*b* may of be open at the lower end 176*b* or closed with a bottom at the lower end 176*b*. In a flattened state, the sleeve 172*b* has a first side 198 and a second side 200. The sleeve 172*b* also has an inner peripheral surface 181*b* which, when the, sleeve 172*b* is opened, defines and encompasses an inner retaining space 182*b* as shown in FIG. 18. When the lower end 176*b* of the sleeve 172*b* has a closed bottom, a portion of the lower end 176*b* may be inwardly folded to form one or more gussets (not shown) for permitting a circular bottom of an object such as a flower pot 202 to be disposed in the inner retaining space 182*b* of the lower end 176*b* of the sleeve 172*b***.

As shown in FIGS. 17 and 18, the sleeve **172*b* is demarcated into an upper portion 204 and a lower portion 206. The lower portion 206 of the sleeve 172*b* is generally sized to contain the flower pot 202. The upper portion 204 of the sleeve 172*b* is sized to substantially surround and encompass a plant 208 contained in the flower pot 202 disposed within the lower portion 206 of the sleeve 172*b*. The sleeve 172*b* is demarcated into the upper portion 204 and the lower portion 206 by a detaching element 210 for enabling the detachment of the upper portion 204 of the sleeve 172*b* from the lower portion 206 of the sleeve 172*b*. In the present version, the detaching element 210 is a plurality of generally laterally-oriented or alternatingly diagonally-oriented perforations which extend circumferentially across the outer peripheral surface 178*b* of the sleeve 172*b* from the first side 198 to the second side 200**.

In a preferred embodiment, as shown in FIGS. 17 and 18, the lower portion 206 of the sleeve **172*b* further comprises a base portion 212 and a skirt portion 214. The base portion 212 comprises that part of the lower portion 206 which, when the flower pot 202 containing the plant 208 is placed into the lower portion 206 of the sleeve 172*b*, has an inner peripheral surface 181*b* which is substantially adjacent to and surrounds an outer peripheral surface 203 of the flower pot 202. The skirt portion 214 comprises that part of the lower portion 206 of the sleeve 172*b* which extends beyond an open upper end 205 of the flower pot 202 and adjacent at least a portion of the plant 208 contained within the flower pot 202 and which is left to freely extend at an angle, inwardly or outwardly, from the base portion 212 when the upper portion 204 of the sleeve 172*b* is detached from the lower portion 206 of the sleeve 172*b* by actuation of the detaching element 210**.

In the intact sleeve **172*b*, the skirt portion 214 comprises an upper peripheral edge congruent with the detaching element 210 which is connected to a lower peripheral edge, also congruent with the detaching element 210, of the upper portion 204 of the sleeve 172*b*. In FIGS. 17 and 18, the upper peripheral edge of the skirt portion 214 is congruent with a series of alternatingly diagonally-oriented lines of perforations which together form a zig-zag and comprise the detaching element 210. The upper portion 204 of the sleeve 172*b* may also have an additional detaching element 220 indicated as a plurality of vertical perforations for facilitating removal of the upper portion 204 and which are disposed more or less vertically therein extending between the detaching element 210 and the upper end 174*b* of the sleeve 172*b***.

The upper portion 204 of the sleeve **172*b* is thereby separable from the lower portion 206 of the sleeve 172*b* by tearing the upper portion 204 along both the detaching element 220 and the detaching element 210, thereby separating the upper portion 204 from the lower portion 206 of the sleeve 172*b*. The lower portion 206 of the sleeve 172*b* remains disposed as the base portion 212 about the flower pot 202 and as the skirt portion 214 about the plant 208 forming a decorative cover 170*b* as shown in FIG. 19 which substantially surrounds and encompasses the flower pot 202 and the plant 208 contained therein. When the upper, portion 204 is detached, the lower portion 206 of the sleeve 172*b* remains about the flower pot 202 and thereby forms the decorative cover 170*b* about the flower pot 202**.

"Detaching element" as used herein, means any element, or combination of elements, or features, such as, but not by way of limitation, perforations, tear strips, zippers, and any other devices or elements of this nature known in the art, or any combination thereof. Therefore, while perforations are shown and described in detail herein, it will be understood that tear strips, zippers, or any other "detaching elements" known in the art, or any combination thereof, could be substituted therefor and/or used therewith.

In a general method of use of sleeve 172*b* as a decorative cover for a flower pot, an operator provides a sleeve 172*b*, and the flower pot 202 having a plant 208 disposed in a growing medium contained within the flower pot 202. The operator then disposes the flower pot 202 having the plant 208 contained therein into the sleeve 172*b* by opening the sleeve 172*b* at its upper end 174*b* and assuring both that the opening 180*b* therein is in an open condition, and that the inner peripheral surface 181*b* of the sleeve 172*b* is somewhat expanded outward as well, as shown in FIG. 18. The operator then manually or automatically disposes the flower pot 202 into the opening 180*b* in the sleeve 172*b*, the flower pot 202 being disposed generally through the upper portion 204 of the sleeve 172*b* into generally the lower portion 206 of the sleeve 172*b*, the flower pot 202 remaining in the lower portion 206 of the sleeve 172*b*, permitting the sleeve 172*b* to substantially surround and tightly encompass the flower pot 202. It will be understood that alternatively, the sleeve 172*b* may be provided with an extension (not shown), and the sleeve 172*b* may be disposed on rodsor wickets, and the flowerpot 202 then being disposed in the sleeve 172*b* either before or after the sleeve 172*b* has been removed from the wickets. It will be appreciated that a general method of use of sleeves 172 and 172*a* substantially similar to the general method of use of sleeve 172*b* as a decorative cover for a flower pot as described in detail hereinbefore may also be employed using sleeve 172 and 172*a* as a decorative cover for a flower pot.

Referring now to FIG. 20, designated generally by the reference numeral 230 is a ribbon material formed from the sheet of folded corrugated material 10.

Any material capable of being corrugated and folded to provide a sheet of folded corrugated material 10 can be employed in the formulation of the ribbon material 230. For example, a polymeric film 232 can be employed to produce the ribbon material 230, and the polymeric film 232 can be polypropylene film having a thickness of from about 0.1 mil to about 30 mil, and more desirably of from about 0.5 mil to about 2.5 mil, or an expanded core polymeric film having a thickness of from about 0.6 mil to about 10 mil.

Changes may be made in the construction and the operation of the various components, elements and assemblies described herein or in the steps or the sequence of steps of the methods described herein without departing from the spirit and scope of the invention as defined in the following claims.

What is claimed:

1. A corrugated decorative grass comprising a plurality of segments wherein each segment is provided with a plurality of folds having a first leg and a second leg wherein each of the first and second legs of the folds extend from a crease of the fold, the plurality of segments comprising segments formed from metallized film and segments formed from paper.

2. The corrugated decorative grass of claim 1 wherein the segments formed from metallized film and the segments formed from paper each have a thickness in the range of from about 0.1 mil to about 30 mil.

3. A corrugated decorative grass having a matte or textured finish that provides the decorative grass with an appearance simulating the appearance of cloth comprising a plurality of segments having at least one surface there of modified to provide the segments with a cloth appearance, the segments having a plurality of folds comprising a first leg, a second leg and a fold crease from which the first and second legs extend, the plurality of segments comprising segments formed from metallized film and segments formed from paper.

4. The corrugated decorative grass of claim 3 wherein the segments formed from metallized film and the segments formed from paper each have a thickness in the range of from about 0.1 mil to about 30 mil.

5. A three-dimensional corrugated decorative grass comprising a plurality of segments produced by cutting sheets of folded material having a plurality of folds wherein each fold is provided with a fold line and wherein the cutting of the sheets of folded material is in an angular direction relative to the fold lines of the folds, the plurality of segments comprising segments formed from metallized film and segments formed from paper.

6. The three-dimensional corrugated decorative grass of claim 5 wherein the angular direction at which the sheets of folded material are cut relative to the fold lines of the fold is about 45 degrees.

7. A corrugated decorative grass comprising a plurality of segments wherein each segment is formed of a laminated material comprising paper and a metallized film, and wherein each segment is provided with a plurality of folds having a first leg and a second leg wherein each of the first and second legs of the folds extend from a crease of the fold.

8. The corrugated decorative grass of claim 7 wherein the segments of the corrugated decorative grass have a thickness in the range of from about 0.1 mil to about 30 mil.

9. A corrugated decorative grass having a matte or textured finish that provides the decorative grass with an appearance simulating the appearance of cloth comprising a plurality of segments wherein each segment is formed of a laminated material having at least one surface thereof modified to provide the segments with a cloth appearance, the laminated material comprising paper and a metallized film, the segments having a plurality of folds comprising a first leg, a second leg and a fold crease from which the first and second legs extend.

10. The corrugated decorative grass of claim 9 wherein the segments having at least one surface thereof modified to provide the segments with a cloth appearance have a thickness in the range of from about 0.1 mil to about 30 mil.

11. A three-dimensional corrugated decorative grass comprising a plurality of segments produced by cutting a sheet of folded laminated material comprising paper and a metallized film, the sheet of folded laminated material having a plurality of folds wherein each fold is provided with a fold line and wherein the cutting of the sheet of folded material is in an angular direction relative to the fold lines of the folds.

12. The three-dimensional corrugated decorative grass of claim 11 wherein the angular direction at which the sheet of folded material is cut relative to the fold lines of the fold is about 45 degrees.

13. A corrugated decorative grass comprising a plurality of segments wherein each segment is formed from a sheet or web of material comprising a sheet or web of paper and a sheet or web of metallized film, and wherein each segment is provided with a plurality of folds having a first leg and a second leg wherein each of the first and second legs of the folds extend from a crease of the fold.

14. The corrugated decorative grass of claim 13 wherein the segments of the corrugated decorative grass have a thickness in the range of from about 0.1 mil to about 30 mil.

15. A corrugated decorative grass having a matte or textured finish that provides the decorative grass with an appearance simulating the appearance of cloth comprising a plurality of segments wherein each segment is formed of a sheet or web of material having at least one surface thereof modified to provide the segments with a cloth appearance, the sheet or web of material comprising a sheet or web of paper and a sheet or web of metallized film, the segments having a plurality of folds comprising a first leg, a second leg and a fold crease from which the first and second legs extend.

16. The corrugated decorative grass of claim 15 wherein the segments having at least one surface there of modified to provide the segments with a cloth appearance have a thickness in the range of from about 0.1 mil to about 30 mil.

17. A three-dimensional corrugated decorative grass comprising a plurality of segments produced by cutting a sheet of folded material comprising a sheet or web of paper and a sheet or web of metallized film, the sheet of folded material having a plurality of folds wherein each fold is provided with a fold line and wherein the cutting of the sheet of folded material is in an angular direction relative to the fold lines of the folds.

18. The three-dimensional corrugated decorative grass of claim 17 wherein the angular direction at which the sheet of folded material is cut relative to the fold lines of the fold is about 45 degrees.

19. A corrugated decorative grass having a matte or textured finish that provides the decorative grass with an appearance simulating the appearance of cloth comprising a plurality of segments having at least one surface there of modified to provide the segments with a cloth appearance, the segments having a plurality of folds comprising a first leg, a second leg and a fold crease from which the first and second legs extend, the segments formed from a sheet or web of material selected from the group consisting of paper, foil, metallized film and combinations thereof.

20. The corrugated decorative grass of claim 19 wherein the segments having at least one surface there of modified to provide the segments with a cloth appearance have a thickness in the range of from about 0.1 mil to about 30 mil.

21. A three-dimensional corrugated decorative grass comprising a plurality of segments produced by cutting a sheet of folded material having a plurality of folds wherein each fold is provided with a fold line and wherein the cutting of the sheet of folded material is in an angular direction relative to the fold lines of the folds, the sheet of folded material selected from the group consisting of paper, foil, metallized film and combinations thereof.

22. The three-dimensional corrugated decorative grass of claim 21, wherein the angular direction at which the sheet of folded material is cut relative to the fold lines of the fold is about 45 degrees.

23. A three-dimensional corrugated decorative grass comprising a plurality of segments produced by cutting a sheet of folded material having a plurality of folds wherein each fold is provided with a fold line and wherein the cutting of the sheet of folded material is in an oblique direction relative to the fold lines of the folds, the sheet of folded material being selected from the group consisting of paper, foil, metallized film and combinations thereof.

24. The three-dimensional corrugated decorative grass of claim 23 wherein the oblique direction at which the sheet of folded material is cut relative to the fold lines of the fold is about 45 degrees.

* * * * *